United States Patent [19]

Moran

[11] 4,097,555

[45] Jun. 27, 1978

[54] TRANSPARENT POLYMERIC POLYBLEND

[75] Inventor: James R. Moran, Hampden, Mass.

[73] Assignee: Monsanto Company, St. Louis, Mo.

[21] Appl. No.: 685,240

[22] Filed: May 11, 1976

[51] Int. Cl.² .................. C08F 291/02; C08L 51/00; C08L 53/00

[52] U.S. Cl. ..................... 260/880 R; 260/95 R; 260/95 C; 260/876 R; 260/876 B; 260/880 B

[58] Field of Search ............ 260/876 B, 876 R, 95 C, 260/880 R, 880 B

[56] References Cited

U.S. PATENT DOCUMENTS

| | | | |
|---|---|---|---|
| 3,265,765 | 8/1966 | Holden et al. | 260/876 |
| 3,485,894 | 12/1969 | Porter | 260/876 B X |
| 3,509,237 | 4/1970 | Aubrey | 260/876 B |
| 3,524,536 | 8/1970 | Terenzi et al. | 260/876 R X |
| 3,792,125 | 2/1974 | Wefer | 260/876 R |
| 3,793,403 | 2/1974 | Dalton et al. | 260/876 R |
| 3,830,889 | 8/1974 | Deets et al. | 260/876 R |
| 3,851,014 | 11/1974 | Dalton | 260/876 R |
| 3,900,529 | 8/1975 | Beer | 260/876 R |
| 3,903,202 | 9/1975 | Carter et al. | 260/880 R |
| 3,914,337 | 10/1975 | Giddings et al. | 260/876 R |
| 3,939,223 | 2/1976 | Powell et al. | 260/876 R |
| 3,950,455 | 4/1976 | Okamoto et al. | 260/880 R |
| 3,963,807 | 6/1976 | Howe | 260/880 R X |
| 4,007,311 | 2/1977 | Harlan, Jr. | 260/880 B X |
| 4,012,462 | 3/1977 | Chaudhary | 260/880 R |
| 4,036,911 | 7/1977 | Smith | 260/880 B X |

FOREIGN PATENT DOCUMENTS

| | | | |
|---|---|---|---|
| 702,737 | 1/1965 | Canada | 260/876 R |

*Primary Examiner*—Thomas De Benedictis, Sr.
*Attorney, Agent, or Firm*—Joseph S. Nelson; William J. Farrington; James C. Logomasini

[57] ABSTRACT

The polymeric polyblend comprises a matrix terpolymer of alkenyl aromatic, alkenyl nitrile and acrylate monomers blended with a grafted block copolymer rubber as dispersed rubber particles, said particles being grafted with and having occluded terpolymer of substantially the same composition of said matrix phase. The polyblend is a product of a mass polymerization process having superior toughness and transparency.

14 Claims, No Drawings

TRANSPARENT POLYMERIC POLYBLEND

BACKGROUND OF THE INVENTION

Polyblends are known in the art as tough engineering plastics having high modulus and great utility for fabricated parts for appliances and automotive parts. ABS polyblends generally comprise a rigid matrix copolymer phase of styrene and acrylonitrile monomers having dispersed therein a graft copolymer of a diene rubber substrate grafted with the styrene/acrylonitrile copolymer. It is known that the graft copolymer is incompatible with the matrix phase and has a different refractive index, hence, the polyblend has a high level of haze providing opaque and translucent polyblends which are generally pigmented as fabricated parts.

There has now been developed a great need for highly transparent polyblends that can be fabricated into transparent parts yet provide the same high level of toughness and modulus typical of ABS polyblends.

The prior art discloses several transparent graft copolymer systems but not for the ABS polyblend types. The transparent graft copolymers disclosed by U.S. Pat. Nos. 2,857,360, 3,177,268, 3,644,584, 3,586,737, 3,670,052 and 3,775,518 teach graft copolymer systems using diene rubber substrate grafted with high levels of acrylate and/or nitrile monomers to provide a graft copolymer with a superstrate refractive index closer to the low refractive index of the diene rubber substrate, hence, providing a transparent graft copolymer for blending with polyvinyl chloride polymethyl methacrylate providing transparent polyblends.

More recently, a polyblend based on a diene rubber interpolymer grafted with styrene and acrylonitrile only and dispersed in a terpolymer of alkenyl aromatic, alkenyl nitrile and acrylate monomers having high transparency has been disclosed in copending application filed under Ser. No. 612,614 to James R. Moran.

It has now been discovered that linear stereospecific diene rubber substrates that are block copolymers having a first block of an alkenyl aromatic monomer, a second block of a conjugated diene monomer and a third block of the alkenyl aromatic monomer provide polyblends having improved low temperature toughness with a low Tg, i.e., $<-80°$ C., yet providing a rubber phase with a high refractive index that can be matched readily with matrix and graft terpolymer phases rich in alkenyl aromatic monomers. Heretofore, interpolymer rubbers of conjugated diene and alkenyl aromatic monomers wherein the comonomers are contained in the rubber in alternating and random sequences gave rubbers having a Tg of about $-20°$ to $-50°$ C. The incorporation of such interpolymer rubbers in polyblends give polyblends with transparency but lack optimum low-temperature toughness.

It has also been discovered that the linear stereospecific block copolymer rubbers are readily soluble in the monomers of the matrix phase so that the polyblends can be prepared by mass polymerization providing greater rubber efficiency and toughening along with higher transparency. Prior art processes shown in the cited art are based on the emulsion polymerization of the rubber and matrix phases which has been found to give higher levels of haze due to retained emulsifiers in the finished polyblend along with less rubber efficiency requiring greater amounts of rubber to provide toughness for the polyblends.

SUMMARY OF THE INVENTION

The present invention relates to:

A transparent polymeric polyblend composition formed of diene, alkenyl aromatic, alkenyl nitrile and acrylate monomers having improved color, toughness and transparency comprising:

A. from about 70 to 98 percent by weight of a matrix terpolymer having from about 35 to 45 percent by weight of an alkenyl aromatic monomer, from about 15 to 25 percent by weight of an alkenyl nitrile monomer and from about 35 to 45 percent by weight of an acrylate monomer selected from the group consisting of alkyl acrylate and alkyl alkacrylate monomers, wherein the improvement comprises: having dispersed therein from 1 to 20 percent by weight of, B. a block diene copolymer rubber as rubber particles having an average particle size of 0.30 to 1.0 microns, said rubber particle being grafted with and have occluded a terpolymer having a composition substantially that of said matrix terpolymer wherein said graft and occluded terpolymers are present in amounts of from 0.50 to 5.0 parts per part of said rubber.

The present invention also relates to:

An improved polymerization process for preparing transparent polymeric polyblends of diene, alkenyl aromatic, alkenyl nitrile and acrylate monomers, wherein said improved process comprises the steps:

A. dissolving a block diene copolymer rubber in a monomer composition comprising 20 to 30 percent by weight of an alkenyl aromatic monomer 25 to 35 percent by weight of an alkenyl nitrile monomer and 40 to 50 percent by weight of an acrylate monomer, said rubber being dissolved in amounts of from about 1 to 20 percent by weight based on said monomer composition forming a polymerization solution, B. mass polymerizing said polymerization solution under shearing agitation so as to convert about 10 to 50 percent by weight said monomers to terpolymers with at least a portion of said monomers being grafted on said rubber as grafts of said terpolymer forming a grafted rubber phase, C. dispersing said grafted rubber phase in said polymerization solution forming a polymerization mixture having said rubber phase dispersed as rubber particles having an average particle size of from about 0.3 to 1.0 microns, said rubber particles having occluded terpolymers wherein said grafted and occluded terpolymers are present in amounts of about 0.50 to 5.0 parts per part of rubber, D. charging sufficient alkenyl aromatic monomer to said polymerizing mixture to bring said alkenyl aromatic weight percent to about 35 to 45 percent by weight based on said monomer composition and polymerizing said monomer composition to about 70 to 99.9 percent conversion, E. separating said polyblend from said polymerization mixture, said polyblend having a terpolymer matrix phase comprising about 35 to 45 percent by weight of alkenyl aromatic monomer, about 15 to 25 percent by weight of alkenyl nitrile monomer and about 30 to 50 percent by weight acrylate monomer, said matrix phase having said rubber particles dispersed therein as a transparent polyblend.

DESCRIPTION OF THE PREFERRED EMBODIMENTS

The Terpolymers

The terpolymers are styreneic terpolymers having a greatest portion of alkenyl aromatic as monovinylidene aromatic monomer in their compositions. Such styreneic monomers found useful in the terpolymers are styrene; alphaalkyl monovinylidene monoaromatic compounds, e.g., alpha-methylstyrene, alphaethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring substituted halostyrene, e.g., o-chlorostyrene, p-chlorostyrene, p-bromostyrene, 2,4-dichlorostyrene, etc.; ringalkyl, ring-halosubstituted styrenes, e.g., 2-chloro-4-methylstyrene, 2,6-dichloro-4-methyl-styrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed. Ethylenically unsaturated nitrile or alkenyl nitrile monomers are used as termonomers in small proportions. Such nitrile monomers found useful are acrylonitrile, methacrylonitrile, ethacrylonitrile and mixtures thereof. Acrylates are used as termonomers. Such acrylate termonomers found to be useful are the alkyl acrylate and alkyl alkacrylate monomers, e.g., methyl acrylate, ethyl acrylate, butyl acrylate, methyl methacrylate, ethyl methacrylate, butyl methacrylate and mixtures thereof.

The matrix terpolymers then contain various proportions of the monomers disclosed in polymerized form comprising: from about 35 to 45 percent by weight of the monovinylidene aromatic monomer, preferably from about 40 to 45 percent by weight; from about 15 to 25 percent by weight of ethylenically unsaturated monomer, preferably from about 17 to 23 percent by weight and from about 35 to 45 percent by weight of the acrylate monomer, preferably from about 35 to 40 percent by weight.

The Block Diene Rubbers

The rubbers are linear stereospecific block diene copolymers having a first block of an alkenyl aromatic monomer, a second block of a conjugated diene and a third block of alkenyl aromatic monomers. Said block diene copolymer rubbers have the general formula A — B — A wherein A is a alkenyl aromatic polymeric block and B is a conjugated diene polymeric block generally called a 3-block copolymer. Said block diene copolymer can have the general formula A — B generally called a 2-block copolymer. Generally the A block moiety has a molecular weight averaging from about 5,000 to 60,000 whereas the B block averages from about 60,000 to 500,000. The molecular weight of the block diene rubber preferably has a molecular weight of from about 100,000 to 200,000. The block copolymer rubbers are generally terminated with methanol, water, oxygen or the like providing hydrogen, hydroxyl alkyl, carboxyl, carbonyl, etc., terminating groups. Generally the diene block copolymer rubbers have a Mooney viscosity ranging from about 5 to 35 preferably from about 10 to 20. The diene block copolymer comprises at least about 55 percent by weight, preferably 65 to 75 percent of the conjugated diene monomer and from about 25–45 percent by weight, preferably 25 to 35 percent, of the alkenyl aromatic monomer.

Such block copolymers are usually prepared in hydrocarbon solutions using alkali-metal organo catalyst capable of forming living polymers with the monomers being fed sequentially. U.S. Pat. No. 3,485,894 discloses suitable methods for preparing the block diene copolymer rubbers.

Mass-Suspension Polymerization Process

In an advantageous combination mass-suspension polymerization process, the monomers, rubber substrate and catalyst (as well as other optional components) are charged to a suitable reactor and thereafter polymerized en masse by heating at a temperature of about 75° to 125° centigrade over a period of about one to forty-eight hours and at a pressure of 1 to 100 pounds per squre inch until a portion of the monomer has been polymerized, generally about 10.0 to 50.0 percent by weight thereof with conventional stirring to aid heat transfer during reaction. The time for this partial polymerization will vary depending upon the catalyst, pressures and temperatures employed and the particular monomers and ratios thereof. Generally, it is preferred to conduct such a prepolymerization process to convert approximately 20.0 to 35.0 percent by weight of the monomer.

Any free radical generating catalyst may be used in the practice of this invention including actinic radiation. It is preferable to incorporate a suitable catalyst system for polymerizing the monomer such as the conventional monomer-soluble peroxy and perazo compounds. Exemplary catalyst are di-tert-butyl peroxide, benzoyl peroxide, lauroyl peroxide, oleyl peroxide, toluyl peroxice, di-tert-butyl diperphthalate, tert-butyl peracetate, tert-butyl perbenzoate, dicumyl peroxide, tert-butyl peroxide isopropyl carbonate, 2,5-dimethyl-2,5 di(tert-butylperoxy)hexane, 2,5-dimethyl-2,5-di(tert-butylperoxy)hexyne-3, tert-butyl hydroperoxide, cumene hydroperoxide, p-methane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 1.0 percent by weight of the polymerizable material. In addition, it may be desirable to include relatively small amounts of antioxidants or stabilizers such as the conventional alkylated phenols, although these may be added during or after polymerization.

The syrup provided by the partially polymerized formulation is then admixed with water in the presence of a suspending agent such as the acrylic acid-acrylate interpolymers of U.S. Pat. No. 2,945,013 granted July 12, 1962. Secondary dispersing aids may also be added to obtain the desired suspension of the syrup in the water. The suspending agent is desirably added to the water although it may be added to the monomers ab initio or during initial polymerization. This suspension is subjected to agitation and heated at a temperature of about 75° to 200° centigrade for a period of one to forty-eight hours to obtain substantially complete polymerization of the monomers therein. Preferably, such further polymerization is carried out at a temperature of about 100° to 170° centigrade for a period of one to twenty hours depending upon the catalyst and the amount thereof employed. After substantial completion of the polymerization reaction, any unreacted monomers or volatile residue components are stripped and the polymer beads are recovered by centrifuging, washed and dried.

Alternatively, the monomers and rubber substrate may be suspended in water initially and the entire polymerization reaction conducted in suspension. In either process, additional monomers, catalyst and other components may be introduced into the polymerizable formulation at various stages of the polymerization process as so desired.

Mass Polymerization Process

One suitable process for mass polymerization is the continuous process disclosed in U.S. Pat. No. 3,903,202.

A monomer composition comprising at least principally a monoalkenyl aromatic monomer, an alkenyl nitrile monomer and an acrylate monomer having about 1.0 to 20 percent by weight of a diene rubber dissolved therein is charged continuously as a monomer-rubber solution to the initial reaction zone. The monomers are polymerized at temperatures of about 100°-150° C. in the first zone converting about 10-50 percent by weight of the monomers to a polymer as a first polymer. At least a portion of the first polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100, a highly desirable degree of improvement in various properties generally is obtained.

The remainder of the first polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer-polymer phase increases and has a volume slightly larger than the monomer-rubber phase, the monomer-rubber phase dispersed as rubber-monomer particles aided by the shearing agitation of the stirred first reaction zone.

The agitation must be sufficient and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.3 to 1.5 microns preferably from 0.5 to 1.0 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

As steady state polymerization, in the initial polymerization zone, the continuously charged monomer composition containing 1.0 to 20 percent by weight diene rubber disperses almost instantaneously, under stirring, forming the rubber-monomer particles which on complete polymerization form discrete rubber particles. The conversion of monomers to polymers in the first reaction zone is controlled between 10-50 percent and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particles become grafted with a first polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 0.5 to 5 parts for each part of said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength measured as a weight average particle size diameter with a photosedimentometer by the published procedure of Graves, M. J. et.al., "Size Analysis of Subsieve Powders Using a Centrifugal Photosedimentometer," British Chemical Engineering 9:742-744 (1964). A Model 3000 Particle Size Analyzer from Martin Sweets Company, 3131 West Market St., Louisville, Ky. was used.

The weight average diameter of the rubber particles also effects gloss and transparency with small particles giving high gloss and the larger particles giving low gloss to the fabricated polyblend article such as a molding or sheet product. One must balance impact strength and gloss requirements in selecting an optimum rubber particle size consistent with transparency.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersability in the monomer-polymer phase.

The initial reactor forms a first partially polymerized mixture of a monomer-polymer phase having the rubber phase described dispersed therein.

The continuous mass polymerization of the first partially polymerized mixture can be carried out by conventional continuous mass polymerization methods. Preferably, step (D) of the present invention is carried out thermally or with free radical catalysis continuous mass polymerization conducted in any of the known polymerization vessels adapted for removal of the unreacted monomers and solvents in vapor form. Most preferably, the thermal mass polymerization reaction is conducted with close control of the reaction temperature by means of removal of the monomer vapor from the reaction vessel. Any temperature controlled polymerization reaction equipment from which monomer vapor can be removed can be employed for the preferred mass polymerization step including stirred tank reactors, horizontal stirred cylindrical reactors, and other such reactors.

The mass polymerization reaction of step (D) can be controlled by varying the nature and amounts of the feed streams into step (B) and/or step (D) and the conditions thereof to produce the desired polyblend. As is well known, it is often desirable to incorporate molecular weight regulators or chain transfer agents into the monomer formulation in relatively small quantities. Such chain transfer agents as mercaptans, halides and terpenes can be added in amounts of from 0.001 to 2.0 percent by weight if desired.

The polymerized mixture of step (D) is continuously subjected to one or more stages of devolatilization to remove the remaining unreacted monomers, saturated solvent and water. Such devolatilization is conducted in known manner in any desired devolatilizers, either of the wiped film or falling strand type. The devolatilization treatment is generally conducted at temperatures of from about 140° to 280° C. at reduced pressures of from 0.01 to 800 mmHg absolute, preferably at from about 180° to 250° C. and a pressure of from 2 to 200 mmHg abs. The third partially polymerized mixture can be preheated before devolatilization to reach the devolatilization temperatures desired by passing through a conventional tube and shell heat exchanger or the like. The product of the devolatilization stage is the polyblend composition substantially freed of free or unreacted monomer or monomers. Such free or residual monomer level is reduced to less than 1.0 pecent by weight and desirably to less than 0.4 percent by weight.

After removal of the devolatilized polyblend from the devolatilization stage generally in the form of a melt it is formed into strands or other shapes by the use of stranding dies or other conventional means and thereafter cooled, cut or pelleted into the desired final size and stored or packaged for shipment. The final operations can all be conducted in conventional manner through the use of known equipment and devices.

Preferably, step (D) is carried out in a staged isobaric stirred reaction zone as a second reaction zone as disclosed in U.S. Pat. No. 3,903,202. The polymerized mixture is polymerized by progressive multistage substantially linear flow polymerization, all said stages operating with shearing agitation and common evaporation vapor phase cooling under isobaric conditions in said second reaction zone, providing each said stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a third partially polymerized mixture having a total polymer content being determined by said multistage steady state polymerization and evaporation of said monomers.

The reactor operates under controlled isobaric conditions. The range of temperatures normally of interest for polymerizing the monomer composition in step (B) are from 130° to 200° C. The operating pressure will range from 6 to 200 psia. The polymerization reaction is exothermic, and cooling is provided primarily by vaporization of a part of the monomer from the reacting mass. Further cooling can be provided by reactor jackets. Cooling by the condensed recycle monomer feeding into the second reaction zone is also provided. The mass is in a boiling condition, and temperature is determined by the natural relationship between vapor pressure and boiling point. This relationship is also a function of the relative amounts of polymer, monomer, dissolved rubber and other substances (e.g. solvents, and additives). Since, as material progresses through this reactor, the amount of polymer continuously increases and the amount of monomer corresponding decreases via polymerization, and monomer content further decreases due to vaporization loss, the temperature progressively increases from inlet to outlet stages. To accommodate the natural swell of the boiling mass, and to provide space for vapor disengagement, the reactor is usually run at a fillage of about 10 to 90 percent, preferably 40 to 60 percent of its volume.

Monomer vapor passes out of the reactor to an external condenser where it is condensed and may also be subcooled. This condensate may then be handled in several ways, for example:

1. The condensate may be returned to at least one of the staged reaction zones.
2. The condensate may be returned to the inlet compartment of the staged reaction zone and mixed with the incoming second partially polymerized reaction mixture.

In a multi-compartment staged reaction zone, each stage is well mixed, and the reaction mass is substantially homogeneous within itself. Baffles can be used to separate the stages discouraging backflow of material between compartments. Clearance between the baffles and the reactor wall does permit some backflow, and also permits the necessary net forwarding of material through the compartments from reactor inlet to outlet giving substantially linear flow.

In a substantially horizontal compartmented staged reactor as here described, the first stage has a relatively low conversion level, since it is being continuously fed by the polymerized mixture of step (C). However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher, and that monomer is being vaporized out of the polymerizing second mixture. Thus, the total conversion to polymer obtained per unit fillage volume of the staged reactor is higher than that which could be obtained in a single stage reactor producing an equal final conversion level at equal temperature.

Clearances between rotating or stationary baffles acting as compartment baffles and cylindrical wall may be from 1 to 10 percent of reactor radius, the larger values being appropriate to the high conversion end of the reactor where viscosity is at maximum. Stage to stage forward flow of the polymerizing mixture is through this clearance, and vapor from the polymerizing mixture also counterflows through the clearance, above the surface level of the polymerizing second mixture.

As described above the second partially polymerized mixture is polymerized by progressive multistage substantial linear flow polymerizations with the conversion of the monomer formulation advancing from about 10–50 percent conversion in the first stage to 50 to 80 percent conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

In the initial reaction zone as the first grafted rubber particle is formed, the rubber particle has a monomer content that corresponds to the monomer content of the monomer-polymer phase. The rubber-monomer particle will stabilize at this level as the monomer polymerizes inside the rubber particle and grafted polymer is formed on the outside. Hence, the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage, less monomer is occluded in the rubber phase particle on dispersion. The first mixture is polymerized in the staged linear flow second zone, and the percent by weight of polymer being formed is progressively higher with each stage having a slightly higher polymer content. The staged linear progressive polymerization not only controls the polymerization of the monomer giving desirable polymers but was found unexpectedly to preserve the integrity of the rubber particles. Although not completely understood, as the first grafted rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the first grafted rubber particle and the monomer-polymer phase at about the same rate, hence, the total polymer content of the occluded monomer-polymer phase of the first grafted rubber particle is about the same as polymer content of the monomer-polymer phase and monomer is not extracted, hence, the weight percent of occlusion is stabilized and remains substantially constant after formation in the initial reactor.

The Matrix Phase of the Polyblend

In the present invention, the monomer composition comprising at least principally a monoalkenylaromatic monomer, an alkenyl nitrile monomer and an acrylate monomer will polymerize readily to form polymers of the matrix phase in the presence of a dispersed rubber phase. Such polymers can be called terpolymers. The polymer is formed in step (B) as a free polymer or the matrix phase in the first partially polymerized mixture with at least a portion of said polymer grafted to the diene rubber forming the grafted diene rubber.

Depending on the proportions of each monomer in the monomer formulation these polymers will have different compositions with the free polymer and the grafted polymers having about the same composition for a given formulation. The matrix phase having uniform monomer composition can be produced by using (a) the adjusted monomer formulation; (b) by keeping the monomer formulation in the reactor uniform by adjusting the proportions of the monomers charged and by (c) limiting the level of conversion so that the differential polymerization rate does not have a material effect on composition.

The present process, then, can produce a wide range of products with varying amounts of grafted rubber and matrix polymers having a range of monomer compositions. In addition, the two polymerization steps provide the capability of producing matrix polymers have a wide range of average molecular weights and molecular weight distributions. It is known that in thermal or catalytic polymerization that the molecular weight of the polymers can be predetermined by polymerizing at different temperatures. The lower the temperature the higher the molecular weight and conversely the higher the temperature the lower molecular weight. Step (B) is normally run at a lower temperature of 100° to 150° C. producing a first polymer having an average molecular weight of 75,000 to 200,000 Staudinger whereas step (D) is normally run at higher temperature of 130° to 180° C. to produce a composite polymer having an average molecular weight of 20,000 to 100,000 Staudinger. By adjusting the temperature of the two reaction zones, a wide variety of matrix polymers and graft polymers can be produced to provide a final polymer with the average molecular weight desired including the molecular weight distribution desired.

As described, it is preferred to run step (D) in a staged isobaric, stirred reaction zone that has an increasing temperature for each stage producing a composite polymer in step (D) with the average molecular weight described.

Preferably, the final polymer of the matrix phase produced by the present invention has a dispersion index $M_w/M_n$), wherein $M_w$ is the weight average molecular weight and $M_n$ is the number average molecular weight ranging from about 2.0 to 4.0, most preferably from 2.2 to 3.5. The dispersion index is well known to those skilled in the art and represents the molecular weight distribution with the lower values having narrow molecular weight distribution and higher values having broader molecular weight distributions. The average molecular weight of the combined polymer of the matrix phase preferable range from 40,000 to 150,000 Staudinger.

The rubbers can be analyzed for graft and occlusions along with swelling index by the well known gel tests. The first or second grafted rubber copolymers is dispersed in tetrahydrofuran (1g/10 ml) which dissolves the polymer leaving the dispersed rubber as a gel phase. The rubber phase is separated from the dispersion by centrifuge as a gel and dried in a vacuum oven at 50° C. for 12 hours and weighed as a dry gel.

% Dry gel in Polyblend = $\dfrac{\text{Weight of Dry gel}}{\text{Weight of polyblend}} \times 100$ % Graft and Occlusions in Rubber = $\dfrac{\text{\% dry gel} - \text{\% rubber}}{\text{Percent rubber}} \times 100$

*Percent rubber determined by infra-red spectrochemical analysis of the dry gel

Parts by weight of graft polymer and occluded polymer per unit weight of rubber = $\dfrac{\text{\% dry gel} - \text{\% rubber}}{\text{Percent rubber}}$ The swelling index of the grafted rubber can range from 5 to 40, preferably 7 to 20.

The swelling index of the rubber graft particles is determined by taking the dry gel above and dispersing it in tetrahydrofuran for 12 hours. The gel is separated by centrifuge and the supernatant toluene drained free. The wet gel is weighed and then dried in a vacuum oven for 12 hours at 50° C. and weighed.

Swelling Index = $\dfrac{\text{weight of wet gel}}{\text{weight of dry gel}}$

The following examples are set forth to illustrate more clearly the principles and practice of this invention to one skilled in the art. They are not intended to be restrictive but merely illustrative of the invention herein described.

EXAMPLE 1

A monomer composition of 524 gm. of styrene (S), 936 gm. of methyl methacrylate (MMA) and 593 gm. of acrylonitrile (AN) was formed containing about 308 gm. (15 percent) of a block copolymer diene rubber (butadiene/styrene of 70/30) dissolved therein as a polymerization solution. Rubber was Solprene$^{(R)}$ 308, purchased from Phillips Petroleum Co., Bartlesville, Okla. having a $M_w$ of 160,000, a $M_n$ of 120,000 and a Mooney viscosity of 15 (ML-4, 212° F.) along with 0.02 gm. of terpinolene and 1.2 gm. of octadecyl 3-(3′, 5′-di-t-butyl-4-hydroxyphenyl) propionate stabilizer.

The polymerization solution was charged to a stirred tank reactor as an initial reactor along with 0.020 weight percent of t-butyl peroxyacetate, 0.07 weight percent of di-t-butyl peroxide.

The polymerization solution was polymerized for 4 hours at 100°–110° C. with agitation forming a syrup which was charged to a second stirred tank reactor and suspended in an aqueous medium with a suspending agent (acrylic acid-acrylate interpolymer of U.S. Pat. No. 2,945,013).

The suspension polymerization formulation was comprised of 4000 grams of water, 30 gm. of $Na_2SO_4$, 2000 grams of the partially polymerized syrup (prepolymer) and 35 ml of a 10% solution of Darvan and 15 ml of terpinolene. The formulation was charged to the reactor, sealed and agitated at 300 rpm. The temperature was raised gradually to 150° C. At 30° C. 70 ml of a 50% polyvinyl alcohol solution was charged followed by 50 ml of a 2% solution of the acrylic acid-acrylate interpolymer at 70° C. as the syrup thinned allowing the agitation to suspend the syrup as globules. At 120° C., 412 grams of styrene monomer is added. When the temperature reaches 150° C. the batch is held at 150° C. for 3 hours substantially polymerizing the remaining monomers providing a polyblend of the matrix terpolymer and the grafted block rubber. The polymerized beads are stripped at 150° C. of any residual monomer, cooled, filtered from the suspension, washed and dried for test purposes. The haze or clarity of polyblend was treated on 0.100 inch or 0.254 cm molded samples as determined by the ASTM D-1003-66 test and found to have a haze value of 13 representative of high clarity.

EXAMPLE 2

A typical ABS polyblend was prepared by a mass suspension process as follows:

Thirteen parts of a soluble butadiene-styrene (70:30) rubber were dissolved in 27.0 parts of acrylonitrile and 60.0 parts styrene. There were added thereto 0.07 part of a mixture of tert-butyl peracetate, 0.05 part di-tert-butyl peroxide and stabilizers. The mixture was heated to 100° centigrade with stirring. Terpinolene was added as a chain transfer agent over a period of approximately five hours in an amount of about 0.1 part per hour for approximately 5 hours, at the end of which time an additional 0.4 part was added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0 percent solution in water at 25° centigrade. The resulting suspension was stirred and heated at 150° C. to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

The haze value of the polyblend was found to be 100, typical of the high haze of polyblends being formed from a butadiene-styrene rubber (Diene 35 procured from the Firestone Rubber Company, Akron, Ohio), having a random distribution of butadiene and styrene which has been grafted with styrene and acrylonitrile monomers forming a grafted rubber phase in situ with a matrix phase of styrene-acrylonitrile polymer only. The impact strength of the polyblend was found to be 2.6 ft.lbs/in. (14.2 kg cm/cm) which is typical for ABS polyblends having a particle size of about 1.0 micron.

EXAMPLE 3

Example 1 was repeated using several levels of terpinolene to vary the particle size of the dispersed rubber particles to determine the effect of particle size on physical properties including haze.

|  | 3a | 3b | 3c | 3d | 3e | 3f |
|---|---|---|---|---|---|---|
| Terpinolene[1] | 0.0 | 0.05 | 0.10 | 0.15 | 0.20 | 0.30 |
| Particle Size ($\mu$)[2] | 0.3 | 0.5 | 0.7 | 1.0 | 2.1 | 3.0 |
| Haze[3] | 5 | 7 | 9 | 13 | 20 | 25 |
| Impact Strength[4] ft.lbs/in. | 0.60 | 2.1 | 3.2 | 4.9 | 3.3 | 2.6 |
| kg.cm/cm | 3.3 | 11.2 | 17.5 | 27.0 | 18.0 | 14.2 |

[1]Terpinolene is a modifier that controls the molecular weight of the grafted polymers when added in the initial charge. Smaller amounts increases the length of the graft and cause the dispersed rubber particles to be smaller. Amounts shown are parts based on parts per hundred parts of monomer and rubber charged to initial reactor keeping the charge of terpinolene in the suspension reactor as in Example 1.
[2]Particle size-mircons.
[3]Haze-ASTM D-1003-66.
[4]ASTM-D256.

It is evident from the data that the particle size can be varied from 0.3 to 1.5 microns providing low haze values yet high impact strength. It is to be noted that the impact strength of polyblends of the present invention using block copolymer rubbers and the terpolymer graft and matrix phase have impact strength of about 4.9 ft.lbs./in. (27 kg cm(cm) at a particle size of about 1.0 micron whereas the ABS polyblends have an impact strength of only about 2.6 ft.lbs/in. (14.2 kg cm(cm). It is also evident from the data that the best balance for haze and impact strength is provided unexpectedly in the range of 0.3 to 1.5 microns.

What is claimed is:

1. An improved transparent polymeric polyblend composition formed of diene, alkenyl aromatic, alkenyl nitrile and acrylate monomers having improved color, toughness and transparency comprising:
   A. from about 70 to 98 percent by weight of a matrix terpolymer having from about 35 to 45 percent by weight of an alkenyl aromatic monomer, from about 15 to 25 percent by weight of an alkenyl nitrile monomer and from about 35 to 45 percent by weight of an acrylate monomer selected from the group consisting of alkyl acrylate and alkyl alkacrylate monomers, wherein the improvement comprises: having dispersed therein from 1 to 20 percent by weight of,
   B. a block diene copolymer rubber as rubber particles having an average particle size of 0.30 to 1.5 microns, said rubber particle being grafted with and have occluded a terpolymer having a composition substantially that of said matrix terpolymer wherein said graft and occluded terpolymers are present in amounts of from 0.50 to 5.0 parts per part of said rubber.

2. A composition of claim 1, wherein said alkenyl aromatic monomer is styrene, said alkenyl nitrile monomer is acrylonitrile and said acrylate monomer is methyl methacrylate.

3. A composition of claim 1, wherein said block diene copolymer comprises about 65 to 75 percent by weight of a conjugated diene monomer and about 25 to 35 percent by weight of an alkenyl aromatic monomer.

4. A composition of claim 3, wherein said diene monomer is selected from the group consisting of butadiene, chloroprene, isoprene and cyclopentadiene.

5. A composition of claim 3, wherein said diene monomer is butadiene and said alkenyl aromatic monomer is styrene.

6. A composition of claim 1, wherein said block diene copolymer has the general formula:

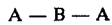

wherein A is an alkenyl aromatic polymeric block and B is a conjugated diene polymeric block.

7. A composition of claim 1, wherein said block copolymer has the general formula:

wherein A is an alkenyl aromatic block and B is a conjugated diene polymeric block.

8. An improved polymerization process for preparing transparent polymeric polyblends of diene, alkenyl aromatic, alkenyl nitrile and acrylate monomers, wherein said improved process comprises the steps:
   A. dissolving a block diene copolymer rubber in a monomer composition comprising 20 to 30 percent by weight of an alkenyl aromatic monomer 25 to 35 percent by weight of an alkenyl nitrile monomer and 40 to 50 percent by weight of an acrylate monomer, said rubber being dissolved in amounts of from about 1 to 20 percent by weight based on said monomer composition forming a polymerization solution,
   B. mass polymerizing said polymerization solution under shearing agitation so as to convert about 10 to 50 percent by weight said monomers to terpolymers with at least a portion of said monomers being grafted on said rubber as grafts of said terpolymer forming a grafted rubber phase,
   C. dispersing said grafted rubber phase in said polymerization solution forming a polymerization mixture having said rubber phase dispersed as rubber particles having an average particle size of from about 0.3 to 1.5 microns, said rubber particles having occluded terpolymers wherein said grafted and occluded terpolymers are present in amounts of about 0.50 to 5.0 parts per part of rubber,
   D. charging sufficient alkenyl aromatic monomer to said polymerizing mixture to bring said alkenyl aromatic weight percent to about 35 to 45 percent by weight based on said monomer composition and polymerizing said monomer composition to about 70 to 99.9 percent conversion,
   E. separating said polyblend from said polymerization mixture, said polyblend having a terpolymer matrix phase comprising about 35 to 45 percent by weight of alkenyl aromatic monomer, about 15 to 25 percent by weight of alkenyl nitrile monomer and about 30 to 50 percent by weight acrylate monomer, said matrix phase having said rubber particles dispersed therein as a transparent polyblend.

9. A process of claim 8, wherein said polymerizing of (D) is carried out in an aqueous suspension in bead form followed by separation of said beads from said aqueous suspension and residual monomer in (E).

10. A process of claim 8, wherein said polymerization of (D) is carried out by mass polymerization followed by devolatilization of residual monomer in step (E).

11. A process of claim 8, wherein said alkenyl aromatic monomer is styrene, said alkenyl nitrile monomer is acrylonitrile and said acrylate monomer is methyl methacrylate.

12. A process of claim 8, wherein the block diene copolymer rubber comprises about 65 to 75 percent by weight of a conjugated diene monomer and about 25 to 35 percent by weight of an alkenyl aromatic monomer.

13. A process of claim 12, wherein said diene monomer is selected from the group consisting of butadiene, chloroprene, isoprene and cyclobutadiene.

14. A composition of claim 12, wherein said diene monomer is butadiene and said alkenyl aromatic monomer is styrene.

* * * * *